(12) United States Patent
Kobayashi

(10) Patent No.: US 6,922,285 B2
(45) Date of Patent: Jul. 26, 2005

(54) OPTICAL SYSTEM FOR PHOTOGRAPHING STEREOSCOPIC IMAGE, AND STEREOSCOPIC IMAGE PHOTOGRAPHING APPARATUS HAVING THE OPTICAL SYSTEM

(75) Inventor: Shuichi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/729,345

(22) Filed: Dec. 5, 2000

(65) Prior Publication Data

US 2001/0004298 A1 Jun. 21, 2001

(30) Foreign Application Priority Data

Dec. 10, 1999 (JP) .............................. 11-351517

(51) Int. Cl.$^7$ .................... G02B 27/22; H04N 13/04
(52) U.S. Cl. ................... 359/462; 359/464; 359/466; 348/55; 348/56
(58) Field of Search ................. 359/462, 464, 359/466, 674, 465, 480, 481, 482, 376, 377, 378; 348/45, 55, 56, 49, 50; 396/324, 326, 327, 331

(56) References Cited

U.S. PATENT DOCUMENTS

| | | | |
|---|---|---|---|
| 3,251,933 A | 5/1966 | Beste | |
| 3,737,567 A | 6/1973 | Kratomi | |
| 3,818,125 A | 6/1974 | Butterfield | |
| 4,178,090 A | 12/1979 | Marks et al. | |
| 4,214,257 A | 7/1980 | Yamauchi | |
| 4,671,628 A | 6/1987 | Wirz et al. | |
| 4,911,530 A | * 3/1990 | Lo | 359/464 |
| 5,097,360 A | * 3/1992 | Fukami et al. | 359/674 |
| 5,134,524 A | 7/1992 | Hamano et al. | 359/687 |
| 5,247,393 A | 9/1993 | Sugawara | 359/690 |
| 5,257,134 A | 10/1993 | Sugawara | 359/679 |
| 5,303,088 A | 4/1994 | Sugawara | 359/753 |
| 5,341,243 A | 8/1994 | Okuyama et al. | 359/687 |
| 5,522,789 A | * 6/1996 | Takahashi | 359/377 |
| 5,550,679 A | 8/1996 | Sugawara | 359/689 |
| 5,552,938 A | 9/1996 | Sugawara | 359/691 |
| 5,557,454 A | * 9/1996 | Takahashi | 359/378 |
| 5,600,490 A | 2/1997 | Sugawara et al. | 359/690 |
| 5,684,635 A | 11/1997 | Sugawara | 359/643 |

(Continued)

FOREIGN PATENT DOCUMENTS

| | | |
|---|---|---|
| EP | 0 107 091 | 5/1984 |
| JP | 63272197 | * 11/1988 |
| JP | 6-327036 | 11/1994 |
| JP | 08-251624 | 9/1996 |
| JP | 08-307904 | 11/1996 |

*Primary Examiner*—Audrey Chang
(74) *Attorney, Agent, or Firm*—Fitzpatrick, Cella, Harper & Scinto

(57) ABSTRACT

A stereoscopic image photographing optical system includes a pair of front optical components of negative refractive power, a combining optical element for superposing respective optical axes of the pair of front optical components on each other, a rear optical component disposed such that the superposed optical axes coincide with an optical axis of the rear optical component, a pair of shutters capable of independently controlling amounts of transmission of light fluxes respectively entering the pair of front optical components from an object, and a pair of deflection mirrors arranged to deflect light fluxes coming from the pair of front optical components and to guide the deflected light fluxes to the combining optical element, wherein the optical system forms parallactic images in a time-series manner by causing the pair of shutters to alternately change the amounts of transmission of light fluxes respectively entering the pair of front optical components from the object.

12 Claims, 13 Drawing Sheets

U.S. PATENT DOCUMENTS

| | | | |
|---|---|---|---|
| 5,701,475 A | 12/1997 | Sugawara | 359/644 |
| 5,757,553 A | 5/1998 | Sugawara | 359/643 |
| 5,781,349 A | 7/1998 | Sugawara | 359/691 |
| 5,835,133 A | 11/1998 | Moreton et al. | 348/49 |
| 5,853,240 A | 12/1998 | Tanaka et al. | |
| 5,886,816 A | 3/1999 | Faris | |
| 5,914,810 A * | 6/1999 | Watts | 359/466 |
| 5,920,433 A | 7/1999 | Sugawara | 359/663 |
| 5,926,316 A | 7/1999 | Sugawara | 359/557 |
| 5,969,873 A | 10/1999 | Sugawara | 359/645 |
| 5,969,875 A | 10/1999 | Sugawara | 359/651 |
| 5,973,847 A | 10/1999 | Sugawara | 359/644 |
| 5,986,806 A | 11/1999 | Sugawara | 359/557 |
| 6,008,949 A | 12/1999 | Sugawara | 359/644 |
| 6,144,493 A | 11/2000 | Okuyama et al. | |
| 6,363,225 B1 * | 3/2002 | Sugawara | 396/331 |

\* cited by examiner

FIG. 9A1   FIG. 9A2   FIG. 9A3   FIG. 9A4
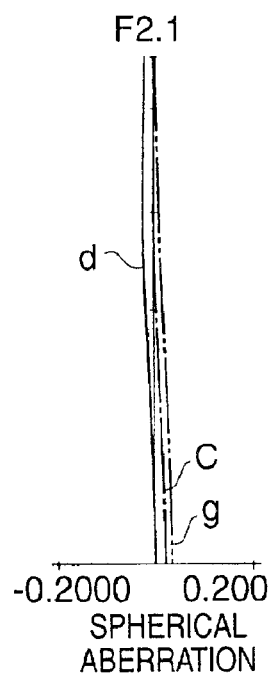
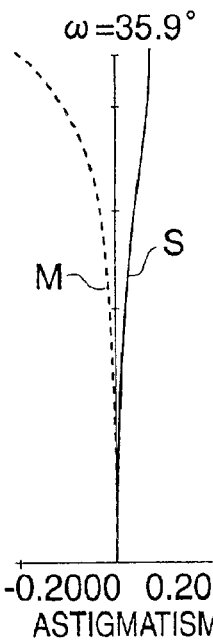
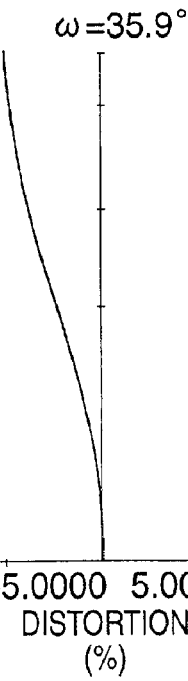
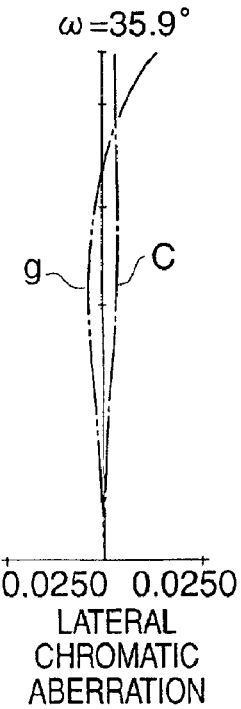
FIG. 9B1   FIG. 9B2   FIG. 9B3   FIG. 9B4
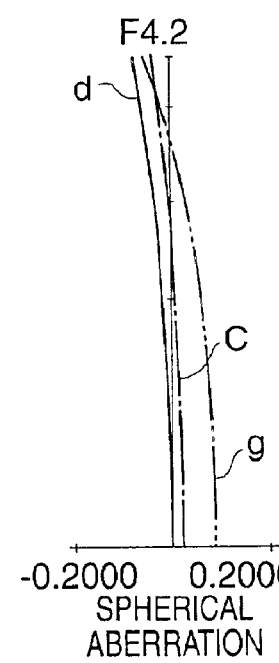
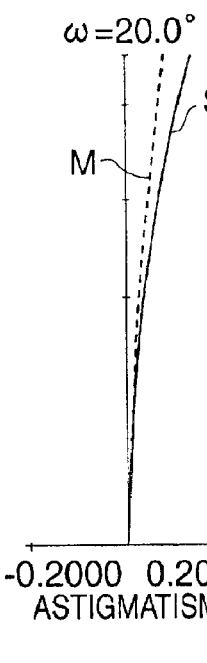
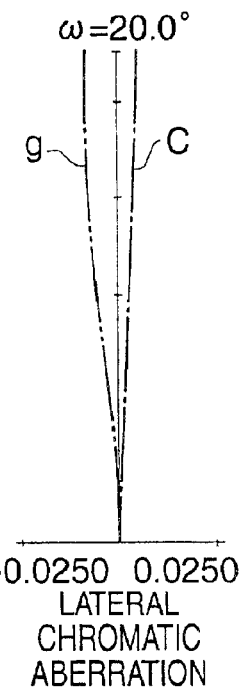

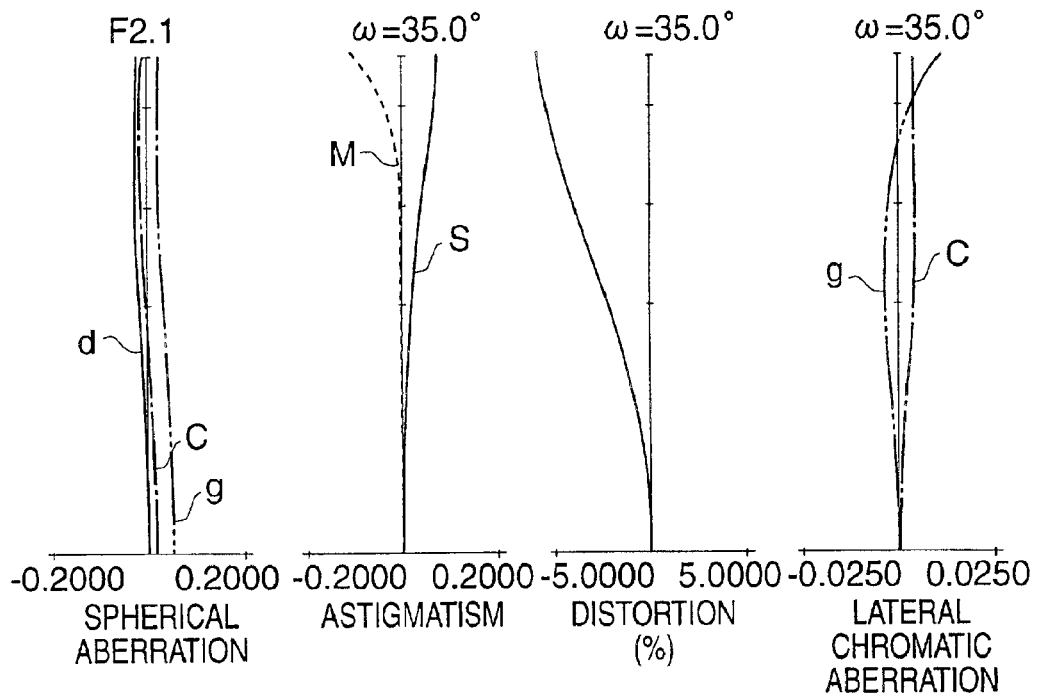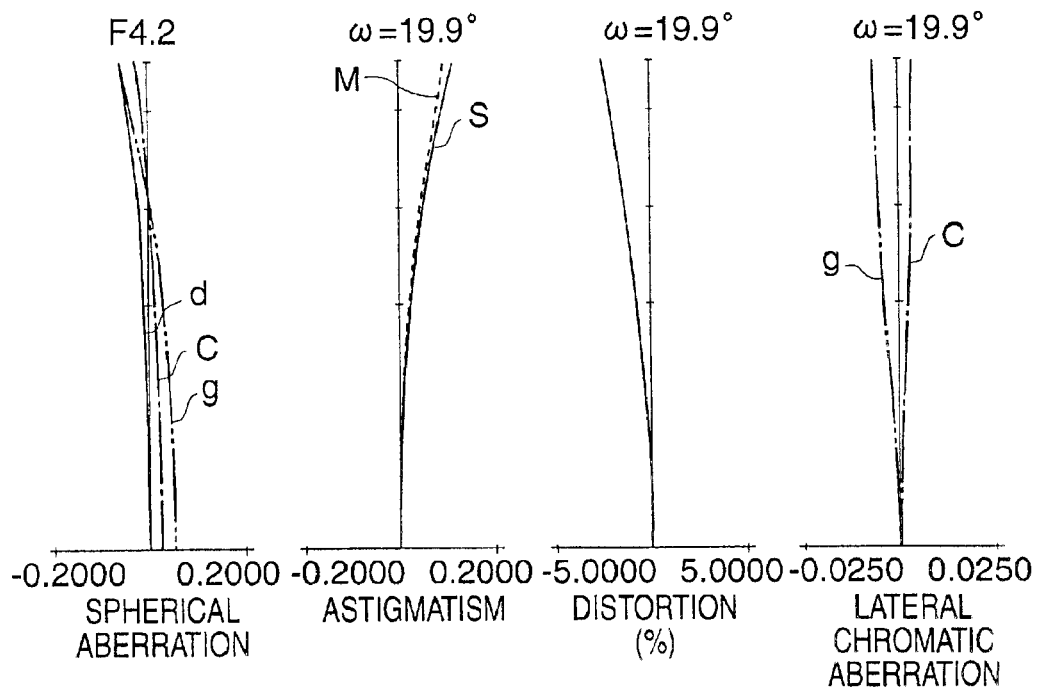

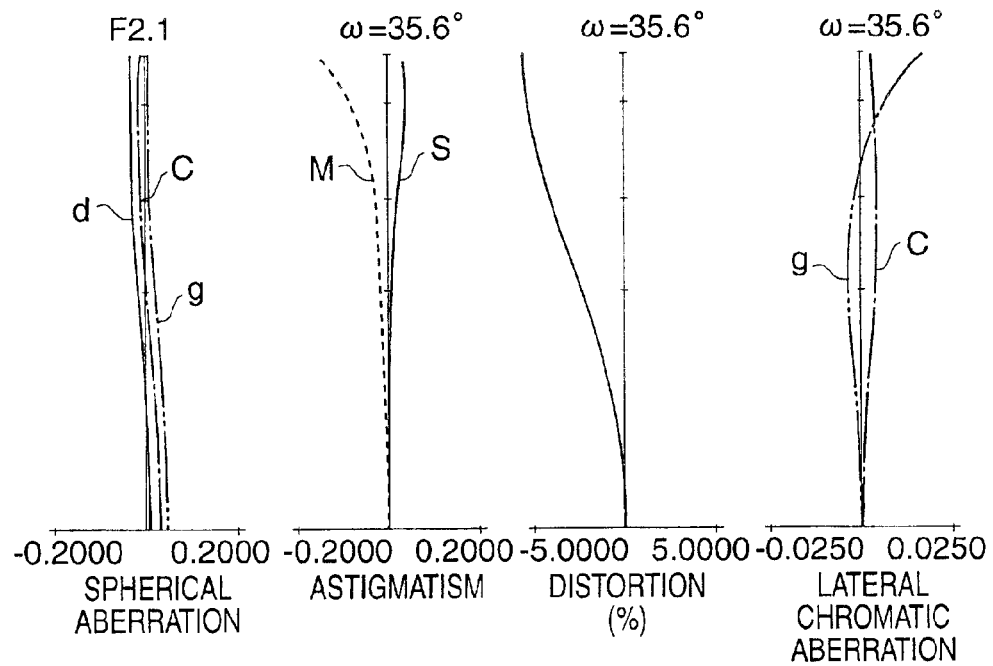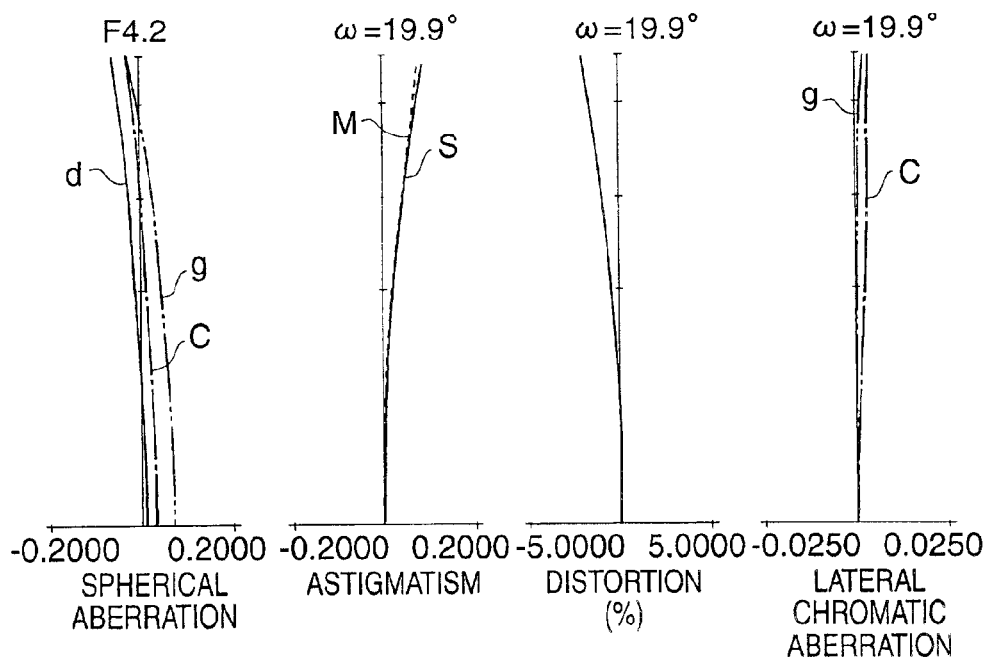

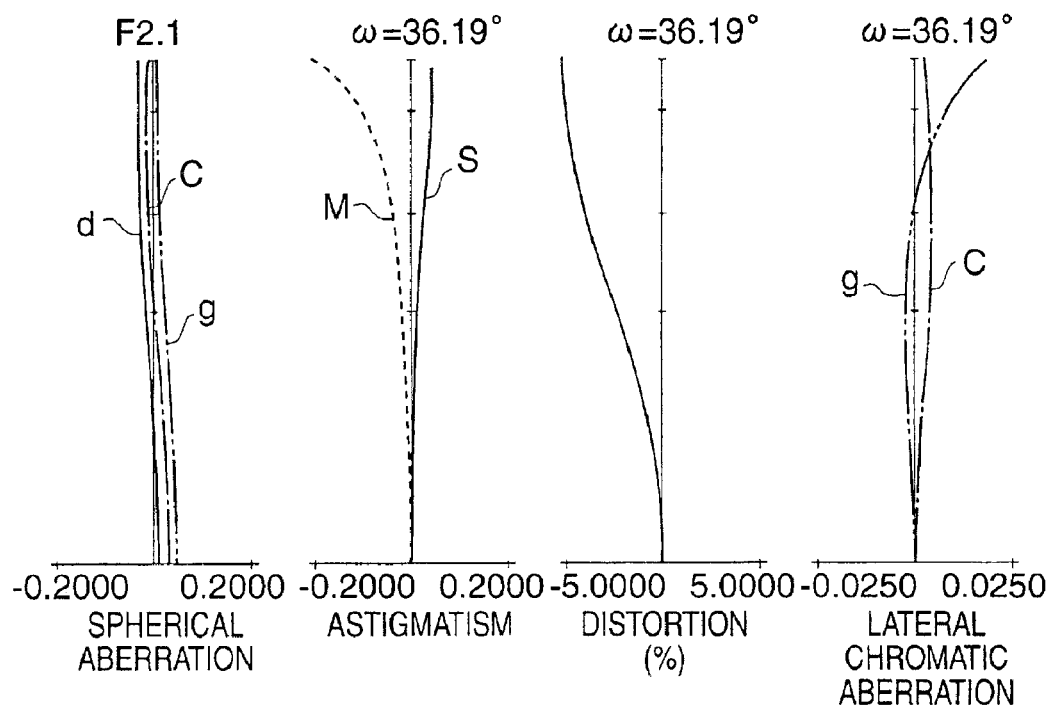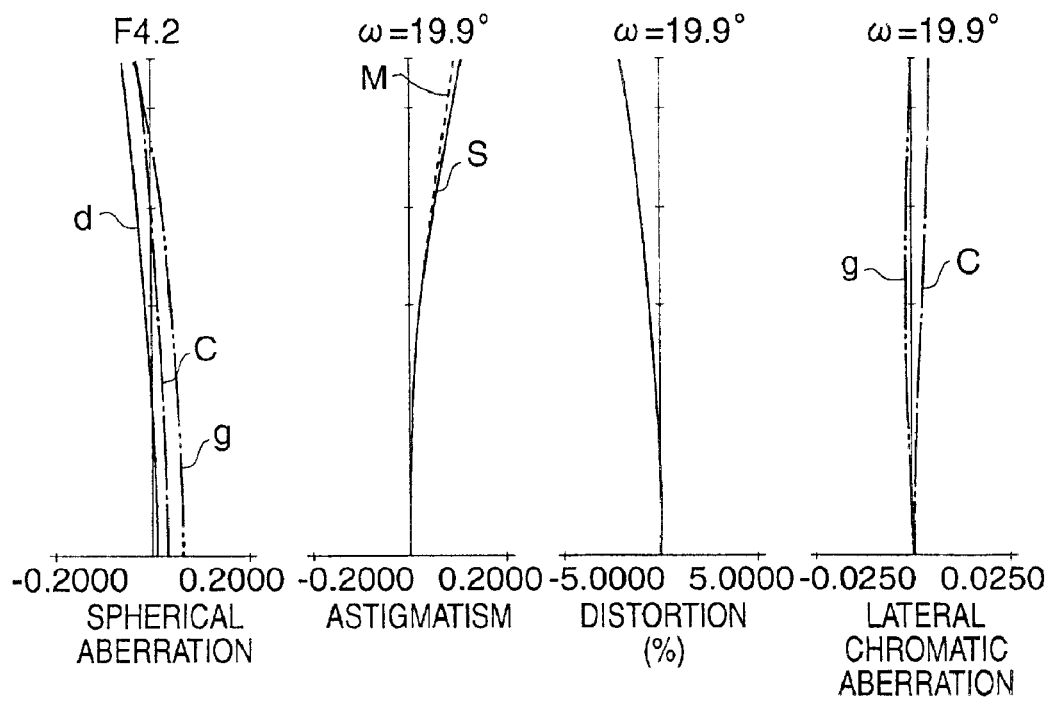

OPTICAL SYSTEM FOR PHOTOGRAPHING STEREOSCOPIC IMAGE, AND STEREOSCOPIC IMAGE PHOTOGRAPHING APPARATUS HAVING THE OPTICAL SYSTEM

BACKGROUND OF THE INVENTION

1. Field of the Invention

The present invention relates to an optical system for photographing a stereoscopic image and a stereoscopic image photographing apparatus having the optical system, which are particularly arranged to be capable of varying magnification and are adapted to obtain images having parallax for right and left eyes (parallactic images) including a photographing range of a relatively wide angle of view.

2. Description of Related Art

In order to observe a stereoscopic image, it is necessary to produce a plurality of parallactic images. Heretofore, there have been proposed a variety of stereoscopic image photographing optical apparatuses or stereoscopic image photographing optical systems for obtaining a plurality of parallactic images, for example, in Japanese Laid-Open Patent Application No. Hei 8-251624, Japanese Laid-Open Patent Application No. Hei 8-307904, etc.

In the case of an embodiment shown in FIG. 1 set forth in the above Japanese Laid-Open Patent Application No. Hei 8-251624, the stereoscopic image photographing optical system is constructed with two, right and left, variable-reflection-angle mirrors, two, right and left, mirrors, two, right and left, pairs of polarizing filters, two, right and left, lens systems, and one image sensor. Then, the pair of polarizing filters are rotated to change the amounts of light based on right and left parallactic images, so that light beams passing respectively through optical paths for the right and left parallactic images are alternately led to the image sensor, thereby obtaining the parallactic images at the image sensor.

Further, in the case of an embodiment shown in FIG. 2 set forth in the above Japanese Laid-Open Patent Application No. Hei 8-251624, the stereoscopic image photographing optical system is constructed with two, right and left, variable-reflection-angle mirrors, two, right and left, mirrors, a polarizing beam splitter, a polarizing filter, a lens system, and an image sensor.

Then, similarly to the embodiment shown in the above-mentioned FIG. 1, the polarizing filter is rotated to change the amounts of light based on right and left parallactic images, so that light beams passing respectively through optical paths for the right and left parallactic images are alternately led to the image sensor, thereby obtaining the parallactic images at the image sensor.

In the case of Japanese Laid-Open Patent Application No. Hei 8-307904, the stereoscopic image photographing optical system is constructed with two, right and left, objective lenses, two, right and left, shutters, a half-mirror for combining two, right and left, images, and a variable magnification optical system for re-forming, on the image sensor, images formed on primary image forming planes of the two, right and left, objective lenses.

However, the stereoscopic image photographing optical system disclosed in the embodiment shown in FIG. 1 set forth in the above Japanese Laid-Open Patent Application No. Hei 8-251624 has such a drawback that, since two photographic lenses are used for one image sensor, optical axes of the photographic lenses inevitably lean with respect to the image sensor, thereby causing blurring at a marginal portion of an image plane.

Further, in the stereoscopic image photographing optical system disclosed in the embodiment shown in FIG. 2 set forth in the above Japanese Laid-Open Patent Application No. Hei 8-251624, the polarizing beam splitter, which is used as an optical-path combining element for combining two optical paths, is composed of a multiple layer. Therefore, there is such a drawback that the characteristics of spectral reflectance are caused to change by a change in angle of incidence of a light flux, thereby causing color unevenness in an image plane.

Further, in the stereoscopic image photographing optical system disclosed in the above Japanese Laid-Open Patent Application No. Hei 8-307904, there is such a drawback that, since aerial images formed by the two, right and left, objective lenses are re-formed by a relay lens, the number of constituent lens elements of the entire optical system becomes large, thereby complicating the construction of the whole apparatus.

In addition, there is such a problem that, since the right and left optical paths are combined by the half-mirror, each of the optical paths comes to have an amount of light decreased due to the reflection and transmission at the half-mirror.

BRIEF SUMMARY OF THE INVENTION

It is an object of the invention to provide a stereoscopic image photographing optical system which has high optical performance without color unevenness, is capable of obtaining a photographic image of a relatively wide angle of view, and is capable of easily obtaining a good stereoscopic image (parallactic images), with the construction of the optical system for photographing a plurality of parallactic images appropriately set, and to provide a stereoscopic image photographing apparatus having the stereoscopic image photographing optical system.

To attain the above object, in accordance with an aspect of the invention, there is provided an optical system, which comprises a pair of front optical components, each of the pair of front optical components having a negative optical power, an optical member for superposing respective optical axes of the pair of front optical components on each other, a rear optical component disposed such that the superposed optical axes coincide with an optical axis of the rear optical component, shutter means capable of independently controlling amounts of transmission of light fluxes respectively entering the pair of front optical components from an object, and a pair of deflection members arranged to deflect light fluxes coming from the pair of front optical components and to guide the deflected light fluxes to the optical member, wherein the optical system forms parallactic images in a time-series manner by causing the shutter means to alternately change the amounts of transmission of light fluxes respectively entering the pair of front optical components from the object.

Further, in accordance with another aspect of the invention, there is provided a stereoscopic image photographing apparatus, which comprises the above optical system as a photographic optical system.

Theses and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 9A1 to 9A4 and FIGS. 9B1 to 9B4 are aberration diagrams showing the various aberrations occurring in the optical system according to the numerical example 1.

FIGS. 11A1 to 11A4 and FIGS. 11B1 to 11B4 are aberration diagrams showing the various aberrations occurring in the optical system according to the numerical example 2.

FIGS. 15A1 to 15A4 and FIGS. 15B1 to 15B4 are aberration diagrams showing the various aberrations occurring in the optical system according to the numerical example 3.

FIGS. 17A1 to 17A4 and FIGS. 17B1 to 17B4 are aberration diagrams showing the various aberrations occurring in the optical system according to the numerical example 4.

DETAILED DESCRIPTION OF THE INVENTION

Hereinafter, preferred embodiments of the invention will be described in detail with reference to the drawings.

Figure 1:
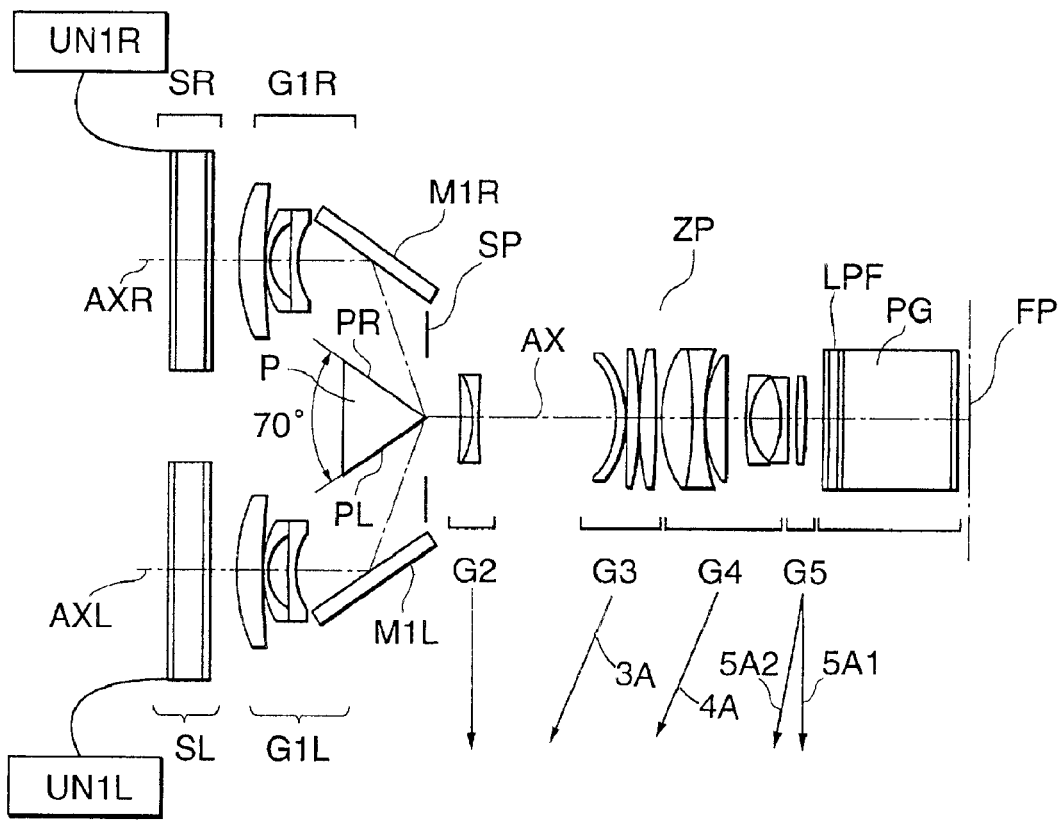
FIG. 1 is a schematic diagram showing essential parts of a stereoscopic image photographing apparatus according to a first embodiment of the invention.

FIG. 1 is an optical sectional view showing the essential parts of a stereoscopic image photographing apparatus according to a first embodiment of the invention. The stereoscopic image photographing apparatus (stereoscopic image photographing optical system) shown in FIG. 1 is arranged to obtain two parallactic images in a time-series manner.

The stereoscopic image photographing optical system shown in FIG. 1 is composed of two, right and left, shutters SR and SL (amount-of-light control means) disposed on right and left optical axes AXR and AXL disposed approximately in parallel at an interval about equal to the interpupillary distance of the man, right and left first lens units G1R and G1L (a pair of front optical components) each having a negative refractive power (optical power=1/"focal length"), deflection mirrors M1R and M1L arranged to deflect inwards the right and left optical axes AXR and AXL by reflection, a combining optical element P composed of a triangular prism for superposing the right and left optical axes AXR and AXL deflected inward by the deflection mirrors M1R and M1L on each other in the vicinity of a stop SP of the optical system, the stop SP arranged to adjust the amount of light, a second lens unit G2 of negative refractive power arranged to be always stationary with respect to an image plane FP, a third lens unit G3 of positive refractive power as a whole arranged to move along the optical axis from the image side toward the object side during the variation of magnification from the wide-angle end (the shortest focal length end) to the telephoto end (the longest focal length end), a fourth lens unit G4 of positive refractive power as a whole arranged to move along the optical axis to compensate for the shift of an image plane due to the variation of magnification, a fifth lens unit G5 of positive refractive power as a whole arranged to be movable along the optical axis according to a change of the distance to an object, an optical low-pass filter LPF, and a color separation prism PG. The second lens unit G2, the third lens unit G3, the fourth lens unit G4 and the fifth lens unit G5 constitute a rear optical component.

In actuality, after being separated into three color light fluxes by the color separation prism PG, the respective color light fluxes reach image planes (image sensor surfaces) provided for different colors. However, in the first embodiment, only one image plane FP is illustrated in FIG. 1.

Referring to FIG. 1, during the variation of magnification from the wide-angle end to the telephoto end, the third lens unit G3 and the fourth lens unit G4 move along the optical axis with loci 3A and 4A, respectively, shown in FIG. 1 so as to perform the variation of magnification and the compensation for the shift of an image plane due thereto. The fifth lens unit G5 is arranged to correct the position of an image due to a change in the distance to an object, i.e., to perform focusing.

Loci 5A1 and 5A2 indicate the positions of the fifth lens unit G5 on the optical axis at the zooming positions (zooming positions from the wide-angle end to the telephoto end) with respect to an infinitely-distant object and a minimum-distance object, respectively. The first to fifth lens units constitute one factor of a variable magnification optical system ZP.

As shown in FIG. 1, the stop SP of the photographing optical system is disposed at a portion close to the object side inside the photographing optical system, and, in the vicinity of the stop SP, the combining optical element P composed of a triangular prism for combining optical paths for right and left images is disposed, so that the diameter of a front lens member can be made relatively small, and the reduction in size of the right and left deflection mirrors M1R and M1L can be attained.

In the first embodiment, an included angle of the combining optical element P which two reflecting surfaces PR and PL thereof make with each other is set to 70°, thereby preventing an effective light flux from being shaded by the stop SP. Further, each of the two reflecting surfaces PR and PL is a surface-reflection mirror, and has an evaporation coating of high reflectance applied thereto.

Next, the disposition of the deflection mirrors M1R and M1L for deflecting the right and left optical axes AXR and AXL inward is described.

Figure 2:
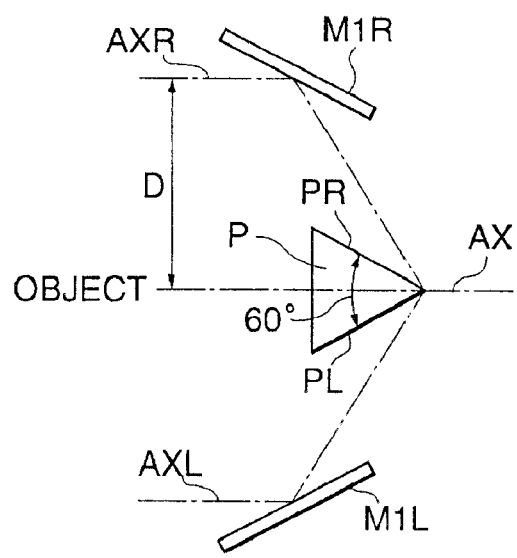
FIG. 2 is a schematic diagram showing the relationship between right and left optical axes and an optical axis obtained by combining the right and left optical axes by means of a combining optical element.

FIG. 2 is a schematic diagram showing the structural relationship among the right and left optical axes AXR and AXL, the combining optical element P and an optical axis AX into which the right and left optical axes AXR and AXL are combined. Incidentally, in the case of FIG. 2, an included angle of the combining optical element P which two reflecting surfaces PR and PL thereof make with each other is set to 60°, unlike FIG. 1. Considering an optical path for the right optical axis AXR, the reflecting surface PR of the combining optical element P and the deflection mirror M1R are approximately parallel with each other, and, therefore, the right optical axis AXR is offset from the optical axis AX by a distance "D".

As a result, if the right and left first lens units G1R and G1L are arranged symmetrically, it is possible to obtain images having an amount of parallax "2D" from the right and left optical axes AXR and AXL.

In this instance, considering the first lens unit G1R disposed between an object and the combining optical element P, two methods are conceivable as the disposition of the first lens unit G1R, one being the method of disposing the first lens unit G1R on the image side of the deflection mirror M1R, and the other being the method of disposing the first lens unit G1R on the object side of the deflection mirror M1R.

Figure 3:
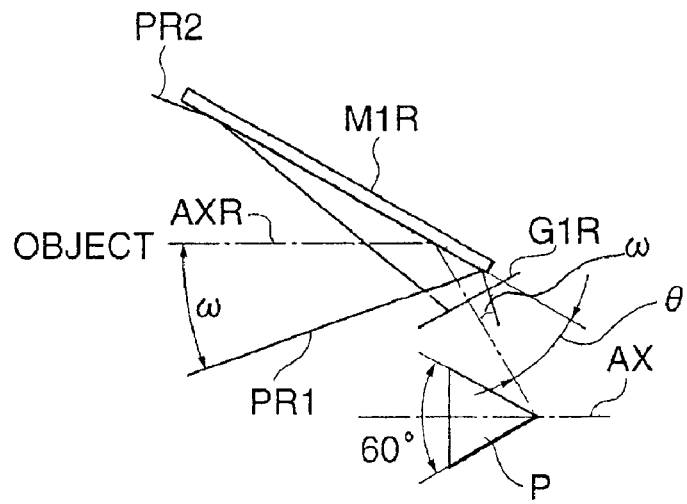
FIG. 3 is an explanatory diagram for a case where a first lens unit is disposed on the image side of a deflection mirror.

FIG. 3 is an explanatory diagram showing the relationship between an angle of view (a half angle of view $\omega$) of the first lens unit G1R and an angle $\theta$ which the deflection mirror M1R makes with the optical axis AXR, in a case where the first lens unit G1R is disposed on the image side of the deflection mirror M1R.

In order for the deflection mirror M1R to have points of intersection with the most off-axial principal rays PR1 and PR2 at the half angle of view $\omega$, as viewed on the surface of the drawing of FIG. 3, it is necessary to satisfy the following condition:

$$\omega < \theta$$

where $\theta$ is an angle which an on-axial ray (the optical axis AXR) and the deflection mirror M1R make with each other as viewed on the surface of the drawing of FIG. 3.

Accordingly, in a case where the first lens unit G1R has a relatively wide angle of view and the half angle of view $\omega$ is large to a certain extent, it is necessary to make the angle $\theta$ larger than the half angle of view $\omega$. Therefore, there is a possibility that the size of the deflection mirror M1R would increase or the most off-axial principal ray would come to have no point of intersection with the deflection mirror M1R. Incidentally, if the angle $\theta$ is one half of an included angle of the combining optical element P which the two reflecting surfaces PR and PL make with each other, the two optical axes AXR and AXL become parallel with each other.

For example, in an optical system having the half angle of view $\omega$ of 22.5° or more at the wide-angle end, which is supposed in the first embodiment, if such a construction as to dispose the first lens unit G1R on the image side of the deflection mirror M1R, as shown in FIG. 3, is adopted, the size of the deflection mirror M1R would increase.

Figure 4:
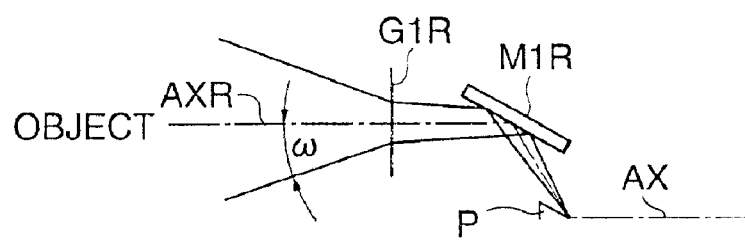
FIG. 4 is an explanatory diagram for a case where the first lens unit is disposed on the object side of the deflection mirror.

Therefore, in the optical system according to the first embodiment, as shown in FIG. 4, the deflection mirror M1R is disposed on the image side of the first lens unit G1R having a negative refractive power.

By this arrangement, since the negative refractive power of the first lens unit G1R makes an opening angle of a light flux incident on the deflection mirror M1R smaller than the half angle of view $\omega$, it is possible to reduce the size of the deflection mirror M1R.

Further, the interval between the combining optical element P and the first lens unit G1R is appropriately set in such a way as to obtain an adequate amount of parallax for performing stereoscopic photography, when the deflection mirror M1R is disposed between the first lens unit G1R of negative refractive power and the combining optical element P.

In the first embodiment shown in FIG. 1, since the variable magnification optical system ZP is located on the common optical axis AX, there is such an advantage that any difference in magnification between right and left images at the time of the variation of magnification or any discrepancy between two optical axes does not occur.

While, in FIG. 1, the right and left shutters SR and SL are disposed on the object side of the first lens units G1R and G1L of negative refractive power, the invention is not limited to this arrangement. The shutters SR and SL may be disposed at any position on the optical axes AXR and AXL between the combining optical element P and the object.

In particular, if the shutters SR and SL are disposed between the first lens units G1R and G1L and the combining optical element P, an angle of incidence of a light flux from the object on the shutters SR and SL is decreased by the negative refractive power of the first lens units G1R and G1L, so that the size of the shutters SR and SL can be reduced, and, in a case where each of the shutters SR and SL is composed of a liquid crystal element, the unevenness of transmission/nontransmission due to the angular dependency of the liquid crystal element can be lowered greatly. Incidentally, in a case where the liquid crystal shutter is disposed between the first lens unit and the combining optical element, it is necessary to correct an optical path length between the first lens unit and the combining optical element, as against that shown in FIG. 1.

Figure 5:
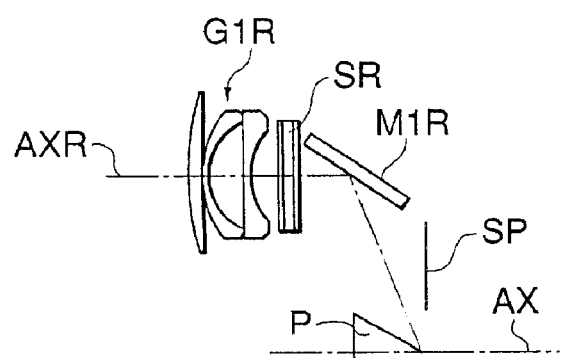
FIG. 5 is an explanatory diagram for a case where a shutter is disposed between the first lens unit and the deflection mirror in the first embodiment.

FIG. 5 is an explanatory diagram showing the right optical path in a case where the shutter SR is disposed between the first lens unit G1R and the deflection mirror M1R.

Figure 6:
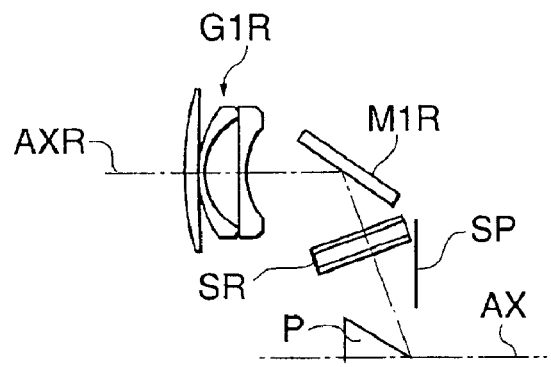
FIG. 6 is an explanatory diagram for a case where the shutter is disposed between the deflection mirror and the combining optical element in the first embodiment.

FIG. 6 is an explanatory diagram showing the right optical path in a case where the shutter SR is disposed between the deflection mirror M1R and the combining optical element P.

Although only the structure for the right optical path is shown in FIGS. 5 and 6, a structure for the left optical path is symmetrical to the structure for the right optical path with respect to the optical axis AX.

The right and left shutters SR and SL are respectively connected to shutter control means UN1R and UN1L shown in FIG. 1, which are controlled by a photographing control circuit (not shown). With the right and left shutters SR and SL controlled in a time-divisional manner, parallactic images are sequentially formed on the image plane FP.

Figure 7:
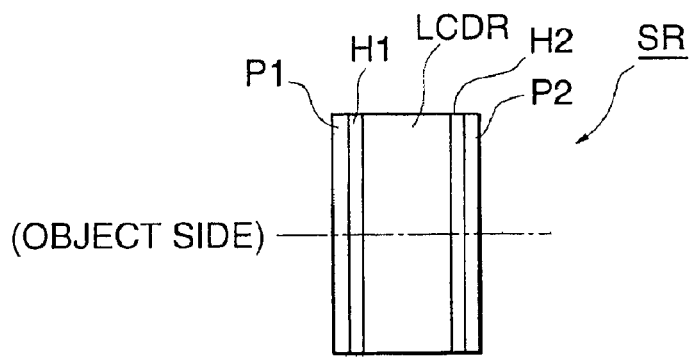
FIG. 7 is a schematic diagram showing essential parts of a liquid crystal shutter.
Figure 8:
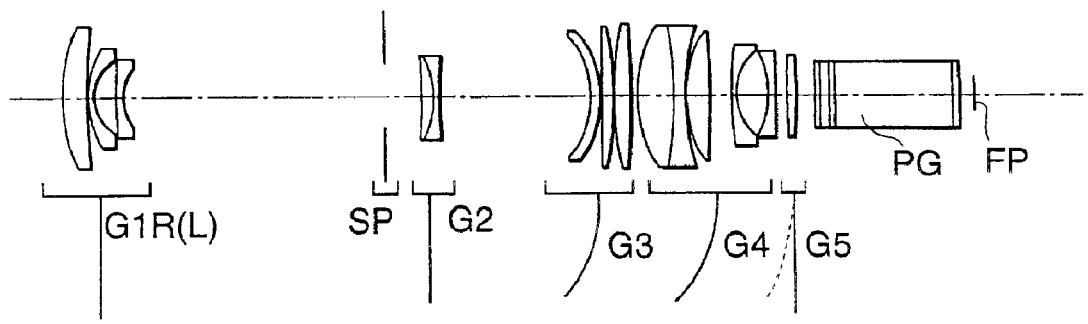
FIG. 8 is a sectional view obtained when an optical path of one optical system of a stereoscopic image photographing optical system according to a numerical example 1 is developed.
Figure 10:
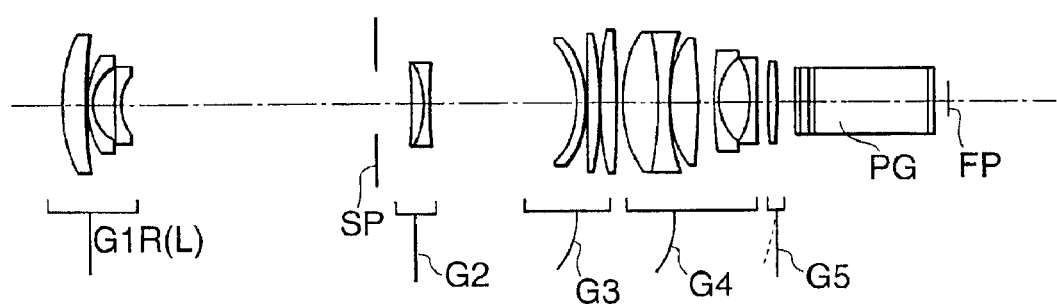
FIG. 10 is a sectional view obtained when an optical path of one optical system of a stereoscopic image photographing optical system according to a numerical example 2 is developed.

FIG. 7 is a schematic diagram showing essential parts of the right shutter SR in the first embodiment.

The liquid crystal shutters SR and SL, serving as amount-of-light control means for the right and left optical paths in the first embodiment, have the same construction. The right liquid crystal shutter SR is composed of, in order from the object side, a ¼ wavelength plate P1, a polarizing plate H1, a liquid crystal LCDR, a polarizing plate H2 and a ¼ wavelength plate P2.

Although not shown, the left liquid crystal shutter SL is composed of, in order from the object side, a ¼ wavelength plate (P3), a polarizing plate (H3), a liquid crystal (LCDL), a polarizing plate (H4) and a ¼ wavelength plate (P4), similarly to the right liquid crystal shutter SR.

An angle $\theta_s$ which a polarization axis of the polarizing plate and an optical axis of the ¼ wavelength plate make with each other is set to 45° for the purpose of forming excellent circularly-polarized light.

The ¼ wavelength plates P1 and P2 (P3 and P4) are respectively disposed on the object side and the image sensor (CCD) side of the liquid crystal shutter SR (SL), which is composed of the liquid crystal LCDR (LCDL) and the two polarizing plates H1 and H2 (H3 and H4). Accordingly, it is possible to prevent a variation in gloss due to polarized light from an object or to prevent the occurrence of moire due to the decrease of an effect of the crystal low-pass filter LPF caused by the polarized light, thereby photographing a natural image.

The liquid crystal shutter SR (SL) is arranged to have the ¼ wavelength plates P1 and P2 (P3 and P4) disposed respectively on the both sides of the liquid crystal shutter SR (SL), so that linearly-polarized light passing through the liquid crystal shutter SR (SL) is converted into circularly-polarized light at the object side and the image sensor side. Accordingly, the influence of an object having a polarizing characteristic or the decrease of an effect of the crystal low-pass filter for separating light beams by utilizing double refraction can be lessened.

In the first embodiment shown in FIG. 1, the correction of the position of an image plane relative to a change in the object distance, i.e., focusing, is performed by the fifth lens unit. However, another lens unit, as long as it is other than the first lens unit, may be used for the correction of the position of an image plane relative to a change in the object distance, i.e., focusing.

Further, for the purpose of further adjusting the amount of light, in addition to the method of varying the aperture of the stop SP, an amount-of-light attenuating filter may be disposed between the first lens unit and the deflection mirror or between the first lens unit and the combining optical element P so as to be insertable into and detachable from there according to the brightness of an object.

Further, in obtaining parallactic images, a distance from the photographing optical system to a point at which the right and left optical axes AXR and AXL intersect on the object side may be varied according to distance information obtained from a distance measuring device (not shown). By this arrangement, it is possible to obtain a more easy-to-view stereoscopic image.

In addition, while, in the first embodiment, a CCD is used as the image sensor, a silver-halide film may be disposed in place of the CCD so as to construct a stereoscopic camera or a stereoscopic moving-image camera. Since moire does not occur when the silver-halide film is used in the photographing apparatus, the ¼ wavelength plate and the crystal low-pass filter LPF disposed on the silver-halide film side may be omitted.

The variable magnification optical system according to one aspect of the invention is constructed with, in order from the object side, a first lens unit of negative refractive power, a stop SP, a second lens unit, and at least two lens units of positive refractive power. The first lens unit and the stop are always stationary with respect to the image plane, and the above at least two lens units of positive refractive power move independent of each other from the image side to the object side when performing the variation of magnification from the wide-angle end to the telephoto end.

Then, an interval D1S between the first lens unit and the stop satisfies the following condition:

$$25 \leq D1S \text{ (mm)} \tag{1}$$

where the interval D1S is an air-converted distance between the first lens unit and the stop. If the lower limit of the condition (1) is exceeded, it becomes difficult to construct such an optical system as to obtain parallactic images adequate to stereoscopic photography.

Further, the variable magnification optical system is characterized in that the following condition is satisfied:

$$1.5 \leq Linp/fw \leq 5 \tag{2}$$

where Linp is a distance from a surface on the most object side of the first lens unit to an entrance pupil (an image of the stop as viewed from the entrance side), and fw is a focal length at the wide-angle end of the variable magnification optical system.

In such a range as to exceed the lower limit of the condition (2), as a refractive power of the first lens unit becomes too strong, the height of an off-axial ray of light passing through the first lens unit becomes small, thereby making it difficult to correct aberration.

Further, in such a range as to exceed the upper limit of the condition (2), the effective diameter of the first lens unit disadvantageously becomes large.

Next, the technical description about the stereoscopic image photographing apparatus having the above-described variable magnification optical system will be made. In order to form, on a common image pickup plane, right and left images having parallax, the combining optical element, which is disposed in the vicinity of the stop of the optical system, combines right and left optical paths, so that it is possible to reduce the size of the combining optical element and to make the optical system have only a little lowering of the amount of light.

Further, the combining optical element and the right and left deflection mirrors are disposed between the first lens unit of negative refractive power and the stop, so that it is possible to reduce the size of each of the deflection mirrors and to perform stereoscopic photography even with an optical system having a wide angle of view.

Further, the right and left shutters are disposed between an object and the combining optical element, so that it is possible to obtain right and left parallactic images in a time-divisional manner. In addition, each of the shutters is composed of a liquid crystal shutter, so that it is possible to realize a stereoscopic image photographing optical system excellent in response.

Further, the combining optical element is composed of surface mirrors or back-surface mirrors, so that it is possible to lessen the decrease of an amount of light.

Further, in the variable magnification optical system, there are disposed, in order from the object side, the first lens unit of negative refractive power, the stop and the second lens unit, so that it is possible to decrease the angle of an off-axial principal ray incident on the stop and to realize the reduction of the diameter of the optical system. In addition, the first lens unit is disposed on the object side of the stop, so that it is possible to correct well off-axial aberration occurring on the image side of the second lens unit.

Further, the variable magnification part is constructed with at least two lens units of positive refractive power, which are disposed on the image side of the second lens unit and are arranged to move from the image side to the object side during the variation of magnification from the wide-angle end to the telephoto end, so that it becomes possible to make the first lens unit and the stop stationary during the variation of magnification, thereby preventing a variation in magnification for right and left optical paths during the variation of magnification and during the focusing operation, or preventing the occurrence of any discrepancy between optical axes.

In the variable magnification optical system, more preferably, since only the first lens unit is disposed on the object side of the stop, it is desirable that a positive lens should be included in the first lens unit for the purpose of correcting off-axial aberration.

Next, numerical data of numerical examples 1 and 2 of the photographing optical system (variable magnification optical system) shown in FIG. 1, as obtained when developing an optical path from the first lens unit G1R (G1L) to the image plane FP, are shown in Table-1 and Table-2, respectively.

Further, a sectional view and aberration diagrams of the photographing optical system according to the numerical example 1, as obtained when developing an optical path thereof, are shown in FIG. 8 and FIGS. 9A1 to 9A4 and 9B1 to 9B4, respectively. A sectional view and aberration diagrams of the photographing optical system according to the numerical example 2, as obtained when developing an optical path thereof, are shown in FIG. 10 and FIGS. 11A1 to 11A4 and 11B1 to 11B4, respectively.

In the numerical data of the numerical examples 1 and 2, ri denotes the radius of curvature of the i-th surface, when counted from the object side, di denotes the i-th optical member thickness or air separation, when counted from the object side, ni and vi respectively denote the refractive index and Abbe number of material of the i-th optical member, when counted from the object side. The last six surfaces in each of the numerical examples 1 and 2 constitute a glass block, such as a color separation prism or a filter.

In actuality, the photographing optical system includes such optical systems as shown in FIG. 1 for combining right and left optical paths, between the first lens unit and the second lens unit. In each of the numerical examples 1 and 2, however, the optical path is assumed to be developed, and numerical data for only one of the right and left optical paths is shown because the right and left optical systems are the same in construction.

In the aberration diagrams shown in FIGS. 9A1 to 9A4 and FIGS. 11A1 to 11A4, which are for the wide-angle end, and in the aberration diagrams shown in FIGS. 9B1 to 9B4 and FIGS. 11B1 to 11B4, which are for the telephoto end, a solid line indicates d-line, a two-dot chain line indicates g-line, and a one-dot chain line indicates C-line.

Further, in the aberration diagrams for astigmatism, a broken line M indicates astigmatism relative to a meridional plane, and a solid line S indicates astigmatism relative to a sagittal plane. Incidentally, in the subsequent aberration diagrams, the same indications are also applied.

Further, in a case where the shutter SR (SL) is disposed between the first lens unit G1R (G1L) and the combining optical element P, as shown in FIGS. 5 and 6, the lens design adapted for such an arrangement should be made.

While, in the first embodiment shown in FIG. 1, an included angle of the combining optical element P which two reflecting surfaces thereof make with each other is set to 70°, the invention is not limited to such an arrangement.

When a distance between the right and left optical axes AXR and AXL (the amount of parallax) and an interval between the first lens unit and the stop are appropriately set and the shading of an off-axial light flux by the stop is taken into consideration, it is desirable that the angle Q which the two reflecting surfaces PR and PL make with each other is limited to the following range:

$$60 \leq Q \leq 80 \text{ (degrees)}.$$

Further, while, in the first embodiment, the variation of magnification and the compensation for the shift of an image plane are effected by the third lens unit G3 and the fourth lens unit G4 and the focusing operation is effected by the fifth lens unit G5, the invention is not limited to such an arrangement.

TABLE 1

Numerical Example 1:
f = 4.15–8.29 mm    Fno = 1:2.1–4.1    2ω = 71.8°–40°

| | | | |
|---|---|---|---|
| r1 = 38.689 | d1 = 4.29 | n1 = 1.72151 | v1 = 29.2 |
| r2 = 255.382 | d2 = 0.20 | | |
| r3 = 21.848 | d3 = 0.70 | n2 = 1.88300 | v2 = 40.8 |
| r4 = 8.918 | d4 = 3.63 | | |
| r5 = −305.287 | d5 = 1.20 | n3 = 1.78590 | v3 = 44.2 |
| r6 = 12.598 | d6 = 43.00 | | |
| r7 = (∞) Stop | d7 = 6.20 | | |
| r8 = −55.286 | d8 = 1.91 | n4 = 1.83400 | v4 = 37.2 |
| r9 = −19.101 | d9 = 0.90 | n5 = 1.48749 | v5 = 70.2 |
| r10 = 72.501 | d10 = Variable | | |
| r11 = −16.092 | d11 = 1.53 | n6 = 1.51742 | v6 = 52.4 |
| r12 = −18.204 | d12 = 0.20 | | |
| r13 = −1132.196 | d13 = 2.17 | n7 = 1.51633 | v7 = 64.1 |
| r14 = −67.789 | d14 = 0.10 | | |
| r15 = 58.916 | d15 = 2.71 | n8 = 1.60311 | v8 = 60.6 |
| r16 = −272.267 | d16 = Variable | | |
| r17 = 25.146 | d17 = 6.14 | n9 = 1.49700 | v9 = 81.5 |
| r18 = −59.634 | d18 = 1.80 | n10 = 1.52249 | v10 = 59.8 |
| r19 = 45.773 | d19 = 0.18 | | |
| r20 = 21.957 | d20 = 4.09 | n11 = 1.49700 | v11 = 81.5 |
| r21 = −249.783 | d21 = 3.19 | | |
| r22 = 46.875 | d22 = 1.00 | n12 = 1.83400 | v12 = 37.4 |
| r23 = 10.913 | d23 = 5.69 | n13 = 1.48749 | v13 = 70.2 |
| r24 = −15.645 | d24 = 0.90 | n14 = 1.83400 | v14 = 37.4 |
| r25 = −151.415 | d25 = Variable | | |
| r26 = 276.664 | d26 = 1.48 | n15 = 1.48749 | v15 = 70.2 |
| r27 = −67.128 | d27 = Variable | | |
| r28 = ∞ | d28 = 0.81 | n16 = 1.55000 | v16 = 60.0 |
| r29 = ∞ | d29 = 1.60 | n17 = 1.52000 | v17 = 69.0 |
| r30 = ∞ | d30 = 0.57 | n18 = 1.55000 | v18 = 60.0 |
| r31 = ∞ | d31 = 20.00 | n19 = 1.58913 | v19 = 61.1 |
| r32 = ∞ | d32 = 0.80 | n20 = 1.51633 | v20 = 64.1 |
| r33 = ∞ | | | |

| Variable | Focal Length | |
|---|---|---|
| Separation | 4.15 | 8.30 |
| d10 | 24.80 | 3.37 |
| d16 | 1.00 | 3.55 |
| d25 | 1.77 | 20.66 |
| d27 (focusing) | 3.20 | 3.20 |

TABLE 2

Numerical Example 2:
f = 4.19–8.31 mm    Fno = 1:2.1–4.1    2ω = 70.0°–39.8°

| | | | |
|---|---|---|---|
| r1 = 33.489 | d1 = 4.17 | n1 = 1.72515 | v1 = 29.2 |
| r2 = 231.544 | d2 = 0.20 | | |
| r3 = 24.328 | d3 = 0.70 | n2 = 1.38300 | v2 = 40.8 |
| r4 = 10.010 | d4 = 3.38 | | |
| r5 = 304.313 | d5 = 1.20 | n3 = 1.78590 | v3 = 44.2 |
| r6 = 11.950 | d6 = 43.00 | | |
| r7 = (∞) Stop | d7 = 6.20 | | |
| r8 = −54.705 | d8 = 1.85 | n4 = 1.83400 | v4 = 37.2 |
| r9 = −19.128 | d9 = 0.90 | n5 = 1.48749 | v5 = 70.2 |
| r10 = 73.946 | d10 = Variable | | |
| r11 = −14.658 | d11 = 1.53 | n6 = 1.51742 | v6 = 52.4 |
| r12 = −16.479 | d12 = 0.20 | | |
| r13 = −700.426 | d13 = 2.16 | n7 = 1.51633 | v7 = 64.1 |
| r14 = −64.107 | d14 = 0.20 | | |
| r15 = 68.907 | d15 = 2.70 | n8 = 1.60311 | v8 = 60.6 |
| r16 = −149.439 | d16 = Variable | | |
| r17 = 27.180 | d17 = 6.58 | n9 = 1.49700 | v9 = 81.5 |
| r18 = −34.741 | d18 = 1.80 | n10 = 1.51633 | v10 = 64.1 |
| r19 = 40.657 | d19 = 0.43 | | |
| r20 = 22.045 | d20 = 4.25 | n11 = 1.49700 | v11 = 81.5 |
| r21 = −104.991 | d21 = 2.38 | | |
| r22 = 48.358 | d22 = 1.00 | n12 = 1.83400 | v12 = 37.4 |
| r23 = 11.894 | d23 = 5.64 | n13 = 1.48749 | v13 = 70.2 |
| r24 = −16.181 | d24 = 0.90 | n14 = 1.83400 | v14 = 37.4 |
| r25 = −158.778 | d25 = Variable | | |
| r26 = 158.941 | d26 = 1.51 | n15 = 1.48749 | v15 = 70.2 |
| r27 = −89.961 | d27 = Variable | | |
| r28 = ∞ | d28 = 0.81 | n16 = 1.55000 | v16 = 60.0 |
| r29 = ∞ | d29 = 1.60 | n17 = 1.52000 | v17 = 69.0 |
| r30 = ∞ | d30 = 0.57 | n18 = 1.55000 | v18 = 60.0 |
| r31 = ∞ | d31 = 20.00 | n19 = 1.58913 | v19 = 61.1 |
| r32 = ∞ | d32 = 0.80 | n20 = 1.51633 | v20 = 64.1 |
| r33 = ∞ | | | |

| Variable | Focal Length | |
|---|---|---|
| Separation | 4.29 | 8.31 |
| d10 | 25.17 | 3.27 |
| d16 | 1.00 | 6.27 |
| d25 | 1.72 | 18.36 |
| d27 (focusing) | 3.17 | 3.17 |

Figure 12:
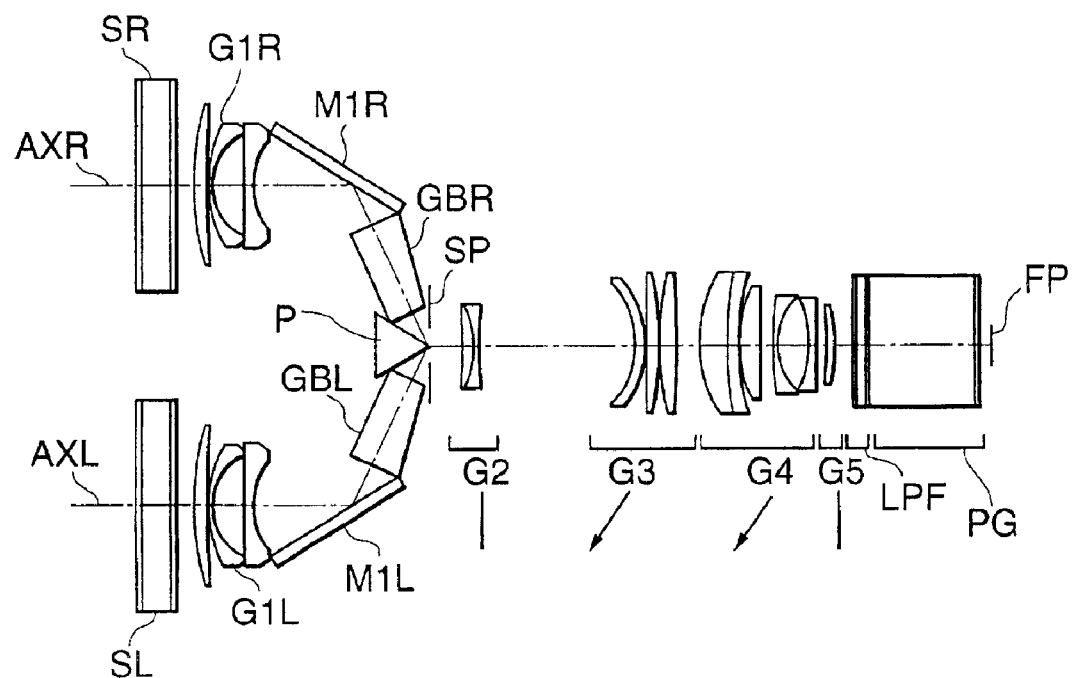
FIG. 12 is a schematic diagram showing essential parts of a stereoscopic image photographing apparatus according to a second embodiment of the invention.

FIG. 12 is a schematic diagram showing essential parts of a stereoscopic image photographing apparatus according to a second embodiment of the invention. In FIG. 12, components having the same reference characters as those shown in FIG. 1 have the same functions as those in FIG. 1, and are, therefore, omitted from the description here.

The second embodiment is the same in construction as the first embodiment shown in FIG. 1, except that, in order to sufficiently secure the distance between the right and left optical axes AXR and AXL (the base line length) as compared with the first embodiment, optical-path adjusting means GBR and GBL, each composed of a glass block, for right and left optical paths are respectively inserted between the deflection mirrors M1R and M1L and the combining optical element P.

By this arrangement, according to the second embodiment, it is possible to lengthen the distance between the right and left optical axes (the base line length).

Figure 13:
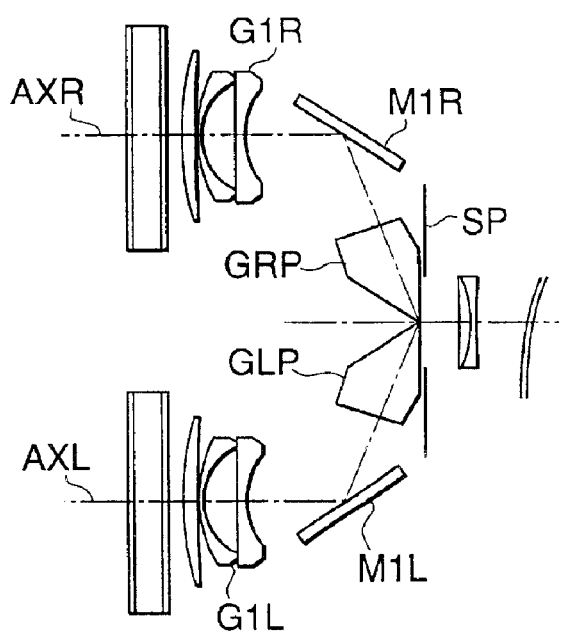
FIG. 13 is a schematic diagram showing essential parts of a stereoscopic image photographing apparatus according to a third embodiment of the invention.

FIG. 13 is a schematic diagram showing essential parts of a stereoscopic image photographing apparatus according to a third embodiment of the invention. In the third embodiment shown in FIG. 13, each of the right and left optical-path adjusting means GBR and GBL shown in FIG. 12 is united with the combining optical element P.

In the third embodiment, thus, the function of the combining optical element P and the function of each of the right and left optical-path adjusting means GBR and GBL are integrated.

By this arrangement, it is possible to attain the simplification of the photographing apparatus.

Referring to FIG. 13, since back-side surfaces of the combining optical elements GRP and GLP are used as reflecting surfaces, if a refractive index of the material of the combining optical elements GRP and GLP is appropriately set, total reflection can be used for the reflecting surfaces. Further, in place of the use of total reflection, the reflecting surfaces may have an evaporation coating of high reflectance applied thereto.

In addition, if a pair of, right and left, deflection mirrors M1R and M1L are respectively united with the combining optical elements GRP and GLP, it becomes possible to lengthen the base line length and to simplify the structure of a mirror portion.

Table-3 and Table-4 show numerical data of numerical examples 3 and 4 of the stereoscopic image photographing optical system. The numerical examples 3 and 4 correspond to the second and third embodiments, in which the optical-path adjusting means is disposed on an optical path between the first lens unit and the stop. In actuality, the photographing optical system includes such optical systems as shown in FIG. 12 for combining right and left optical paths, between the first lens unit G1R (G1L) and the second lens unit G2. In each of the numerical examples 3 and 4, however, the optical path is assumed to be developed.

In particular, since the optical-path adjusting means is expressed as a glass block GB having no refractive power, no difference in optical performance is made even if the optical-path adjusting means is disposed at any position as long as the interval between the first lens unit and the stop is kept. Therefore, it is desirable that the position of the optical-path adjusting means should be decided by appropriately selecting the amount of parallax and the angle of a reflecting surface of the combining optical element.

Figure 14:
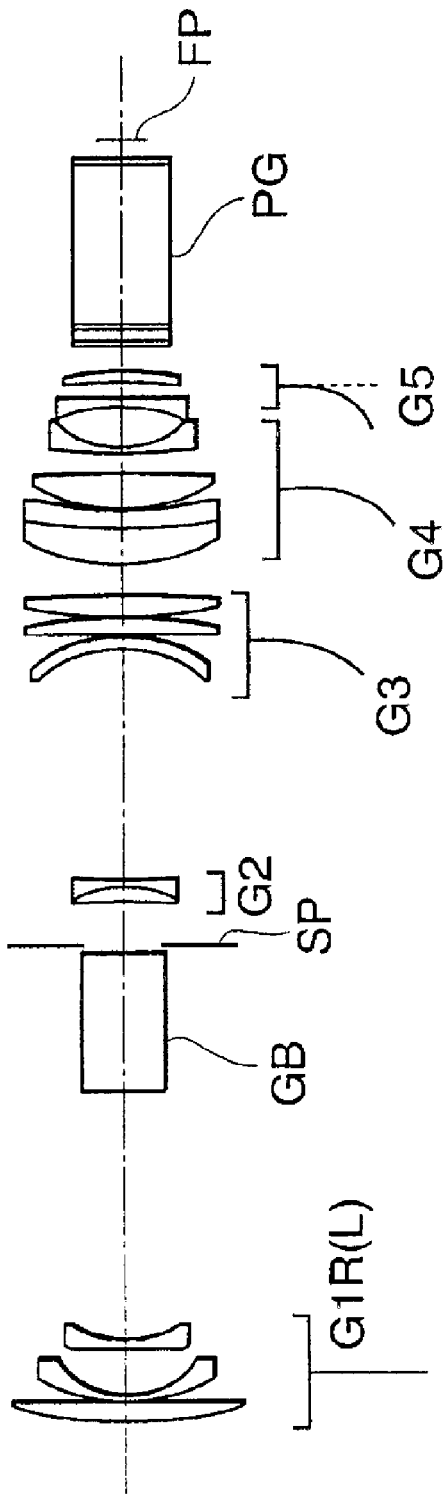
FIG. 14 is a sectional view obtained when an optical path of one optical system of a stereoscopic image photographing optical system according to a numerical example 3 is developed.
Figure 16:
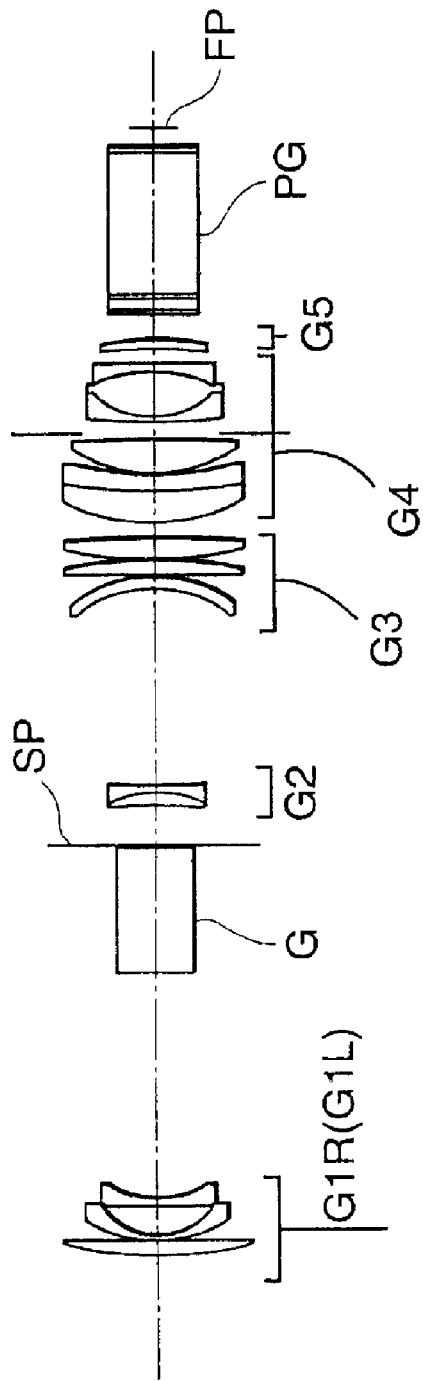
FIG. 16 is a sectional view obtained when an optical path of one optical system of a stereoscopic image photographing optical system according to a numerical example 4 is developed.

Further, numerical data for only one of the right and left optical paths is shown because the right and left optical systems are the same in construction. FIG. 14 and FIG. 16 show the sectional shapes of the optical systems according to the numerical examples 3 and 4, respectively. Further, FIGS. 15A1 to 15A4 and 15B1 to 15B4 and FIGS. 17A1 to 17A4 and 17B1 to 17B4 are aberration diagrams of the numerical examples 3 and 4, respectively.

TABLE 3

Numerical Example 3:
f = 4.19–8.30 mm    Fno = 1:2.1–4.2    2ω = 71.2°–39.8°

| | | | |
|---|---|---|---|
| r1 = 50.270 | d1 = 2.37 | n1 = 1.72515 | v1 = 29.2 |
| r2 = 330.486 | d2 = 0.20 | | |
| r3 = 21.431 | d3 = 0.70 | n2 = 1.88300 | v2 = 40.8 |
| r4 = 10.910 | d4 = 6.22 | | |
| r5 = −1085.209 | d5 = 1.20 | n3 = 1.78590 | v3 = 44.2 |
| r6 = 13.449 | d6 = 33.00 | | |
| r7 = ∞* | d7 = 18.00 | n4 = 1.60311 | v4 = 60.6 |
| r8 = ∞* | d8 = 0.75 | | |
| r9 = Stop (∞) | d9 = 6.20 | | |
| r10 = −50.226 | d10 = 1.78 | n5 = 1.83400 | v5 = 37.2 |
| r11 = −19.098 | d11 = 0.90 | n6 = 1.48749 | v6 = 70.2 |
| r12 = 94.439 | d12 = Variable | | |
| r13 = −15.879 | d13 = 1.53 | n7 = 1.51742 | v7 = 52.4 |
| r14 = −18.029 | d14 = 0.20 | | |
| r15 = 628.911 | d15 = 2.46 | n8 = 1.51633 | v8 = 64.1 |
| r16 = −60.908 | d16 = 0.20 | | |
| r17 = 86.213 | d17 = 2.43 | n9 = 1.60311 | v9 = 60.6 |
| r18 = −218.347 | d18 = Variable | | |

TABLE 3-continued

Numerical Example 3:
f = 4.19–8.30 mm    Fno = 1:2.1–4.2    2ω = 71.2°–39.8°

| | | | |
|---|---|---|---|
| r19 = 27.393 | d19 = 4.97 | n10 = 1.49700 | v10 = 81.5 |
| r20 = 91.863 | d20 = 1.80 | n11 = 1.58476 | v11 = 62.3 |
| r21 = 47.174 | d21 = 0.30 | | |
| r22 = 21.329 | d22 = 4.50 | n12 = 1.49700 | v12 = 81.5 |
| r23 = −151.684 | d23 = 2.21 | | |
| r24 = 60.501 | d24 = 1.00 | n13 = 1.83400 | v13 = 37.4 |
| r25 = 12.182 | d25 = 6.01 | n14 = 1.48749 | v14 = 70.2 |
| r26 = −16.707 | d26 = 0.90 | n15 = 1.83400 | v15 = 37.4 |
| r27 = −101.409 | d27 = Variable | | |
| r28 = −286.374 | d28 = 1.55 | n16 = 1.48749 | v16 = 70.2 |
| r29 = −45.710 | d29 = Variable | | |
| r30 = ∞ | d30 = 0.81 | n17 = 1.55000 | v17 = 60.0 |
| r31 = ∞ | d31 = 1.60 | n18 = 1.52000 | v18 = 69.0 |
| r32 = ∞ | d32 = 0.57 | n19 = 1.55000 | v19 = 60.0 |
| r33 = ∞ | d33 = 20.00 | n20 = 1.58913 | v20 = 61.1 |
| r34 = ∞ | d34 = 0.80 | n21 = 1.51633 | v21 = 64.1 |
| r35 = ∞ | | | |

*Optical-Path Adjusting Means

| Variable | Focal Length | |
|---|---|---|
| Separation | 4.19 | 8.38 |
| d12 | 29.39 | 3.04 |
| d18 | 4.65 | 14.10 |
| d27 | 1.84 | 18.74 |
| d29 (focusing) | 3.18 | 3.18 |

TABLE 4

Numerical Example 4:
f = 4.14–8.29 mm    Fno = 1:2.1–4.1    2ω = 71.2°–39.8°

| | | | |
|---|---|---|---|
| r1 = 36.443 | d1 = 2.46 | n1 = 1.72515 | v1 = 29.2 |
| r2 = 199.905 | d2 = 0.20 | | |
| r3 = 23.160 | d3 = 0.70 | n2 = 1.88300 | v2 = 40.8 |
| r4 = 9.561 | d4 = 4.22 | | |
| r5 = 390.216 | d5 = 1.20 | n3 = 1.78590 | v3 = 44.2 |
| r6 = 13.449 | d6 = 32.00 | | |
| r7 = ∞* | d7 = 17.60 | n4 = 1.51633 | v4 = 64.1 |
| r8 = ∞* | d8 = 0.10 | | |
| r9 = Stop (∞) | d9 = 6.20 | | |
| r10 = −53.738 | d10 = 1.81 | n5 = 1.83400 | v5 = 37.2 |
| r11 = −18.981 | d11 = 0.90 | n6 = 1.48749 | v6 = 70.2 |
| r12 = 74.644 | d12 = Variable | | |
| r13 = −15.815 | d13 = 1.53 | n7 = 1.51742 | v7 = 52.4 |
| r14 = −18.161 | d14 = 0.20 | | |
| r15 = 635.021 | d15 = 2.42 | n8 = 1.51633 | v8 = 64.1 |
| r16 = −62.379 | d16 = 0.10 | | |
| r17 = 75.519 | d17 = 3.28 | n9 = 1.60311 | v9 = 60.6 |
| r18 = −218.125 | d18 = Variable | | |
| r19 = 26.454 | d19 = 4.82 | n10 = 1.49700 | v10 = 81.5 |
| r20 = −1733.325 | d20 = 1.80 | n11 = 1.51633 | v11 = 64.1 |
| r21 = 42.460 | d21 = 0.57 | | |
| r22 = 21.703 | d22 = 4.37 | n12 = 1.49700 | v12 = 81.5 |
| r23 = −133.805 | d23 = 2.52 | | |
| r24 = 63.588 | d24 = 1.00 | n13 = 1.83400 | v13 = 37.4 |
| r25 = 12.233 | d25 = 6.25 | n14 = 1.48749 | v14 = 70.2 |
| r26 = −15.689 | d26 = 0.90 | n15 = 1.83400 | v15 = 37.4 |
| r27 = −85.141 | d27 = Variable | | |
| r28 = −2658.988 | d28 = 1.52 | n16 = 1.48749 | v16 = 70.2 |
| r29 = −55.290 | d29 = Variable | | |
| r30 = ∞ | d30 = 0.81 | n17 = 1.55000 | v17 = 60.0 |
| r31 = ∞ | d31 = 1.60 | n18 = 1.52000 | v18 = 69.0 |
| r32 = ∞ | d32 = 0.57 | n19 = 1.55000 | v19 = 60.0 |
| r33 = ∞ | d33 = 20.00 | n20 = 1.58913 | v20 = 61.1 |
| r34 = ∞ | d34 = 0.80 | n21 = 1.51633 | v21 = 64.1 |
| r35 = ∞ | | | |

*Optical-Path Adjusting Means

| Variable | Focal Length | |
|---|---|---|
| Separation | 4.14 | 8.29 |
| d12 | 27.64 | 3.14 |
| d18 | 2.09 | 9.36 |
| d27 | 1.72 | 18.94 |
| d29 (focusing) | 3.18 | 3.18 |

While, in each of the above-described first, second and third embodiments, the right and left optical axes AXR and AXL are disposed approximately in parallel with each other, a distance from the photographing optical system to a point at which the right and left optical axes AXR and AXL intersect on the object side may be varied according to object distance information. By this arrangement, it is possible to realize a stereoscopic image photographing optical system capable of obtaining a more easy-to-view stereoscopic image.

Figure 18:
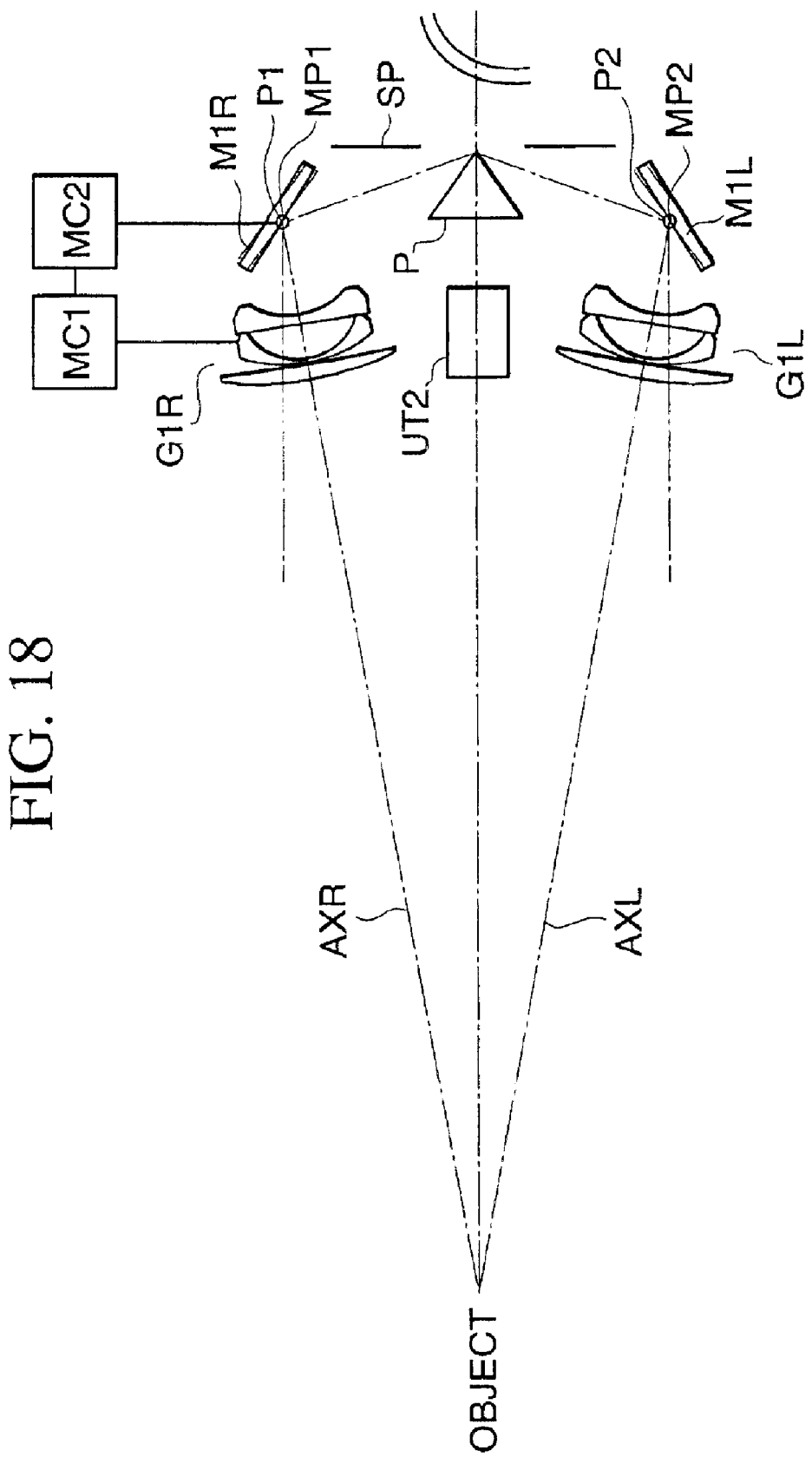
FIG. 18 is a schematic diagram showing essential parts of a stereoscopic image photographing apparatus according to a fourth embodiment of the invention.

FIG. 18 is a schematic diagram showing essential parts of a stereoscopic image photographing apparatus according to a fourth embodiment of the invention. In the fourth embodiment shown in FIG. 18, the right and left optical axes AXR and AXL are arranged to intersect according to distance information obtained from a distance measuring device UT2 which is disposed between the right and left optical systems.

Referring to FIG. 18, the deflection mirrors M1R and M1L are arranged to be rotatable around shafts MP1 and MP2, respectively, which extend perpendicularly to the plane of the drawing of FIG. 18 and include intersection points P1 and P2 respectively between the deflection mirror M1R and the optical axis AXR and between the deflection mirror M1L and the optical axis AXL. When the deflection mirrors M1R and M1L rotate by φ°, the optical axes AXR and AXL deflect by 2φ° due to reflection. Accordingly, in this instance, the first lens units G1R and G1L of negative refractive power are rotated by 2φ° around the shafts MP1 and MP2, respectively.

In order to perform the above rotating operation, there are disposed an actuating means MC1 for rotating the first lens units G1R and G1L and an actuating means MC2 for rotating the deflection mirrors M1R and M1L.

Although, in FIG. 18, the actuating means MC1 and MC2 are shown only for the right optical path, the similar actuating means are also provided for the left optical path.

The actuating means MC1 and MC2 for driving the first lens units G1R and G1L and the deflection mirrors M1R and M1L may be provided with mechanical parts, such as link mechanisms, or may be provided with individual actuators, such as stepping motors, so as to be electrically controlled in the similar effective manner.

Further, since operations for the right and left optical paths are symmetrical, mechanical components may be provided to drive the operations for the right and left optical paths in an interlocking manner, or individual actuators may be provided to electrically drive the operations for the right and left optical paths, or the mechanical components and the individual actuators may be combined in the similar effective manner.

Figure 19:
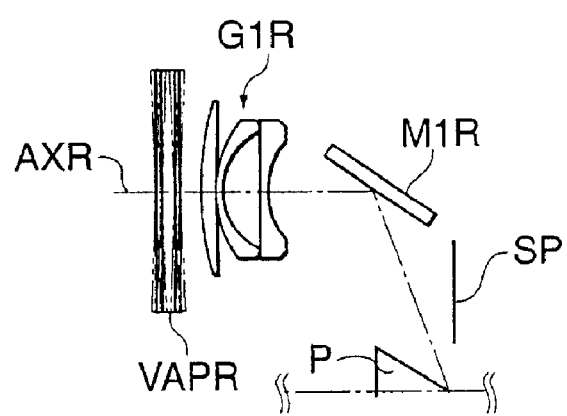
FIG. 19 is an explanatory diagram for a case where a part of the stereoscopic image photographing apparatus shown in FIG. 18 is modified.

FIG. 19 is a schematic diagram showing essential parts of a stereoscopic image photographing apparatus in which a part for deflecting the optical axis shown in FIG. 18 is modified. In the case of FIG. 19, in order to enable the right and left optical axes AXR and AXL to intersect, a deflection element VAPR having a variable prism apex angle is disposed on the object side of the first lens unit G1R of negative refractive power.

Although, in FIG. 19, only an optical system for the right optical axis AXR is shown, the other optical system for the left optical axis AXL is provided symmetrically. Referring to FIG. 19, the deflection element VAPR is a variable angle prism, which is capable of causing the right and left optical axes AXR and AXL to intersect by controlling the prism apex angle according to distance information obtained from a distance measuring device (not shown). As a result, it is possible to obtain a more natural stereoscopic image.

As has been described above, by appropriately setting the construction of an optical system for photographing a plurality of parallactic images, it is possible to attain a stereoscopic image photographing optical system which has high optical performance without color unevenness, is capable of obtaining a photographic image of a relatively wide angle of view, and is capable of easily obtaining a good stereoscopic image (parallactic images), and to attain a stereoscopic image photographing apparatus having the stereoscopic image photographing optical system.

Further, it is possible to attain a small-sized stereoscopic image photographing apparatus with a simple construction. In particular, it is possible to realize a stereoscopic image photographing optical system capable of securing a relatively wide-angle photographing area.

What is claimed is:

1. An optical system for forming parallactic images in a time-series manner, comprising:
   a pair of front optical components, each of said pair of front optical components having a negative optical power;
   an optical for superposing respective optical axes of said pair of front optical components on each other;
   a rear optical component disposed such that the superposed optical axes coincide with an optical axis of said rear optical component, said rear optical component having a lens unit arranged to move along the optical axis for variation of magnification;
   a pair of shutter members arranged to alternately change amounts of transmission of light fluxes respectively entering said pair of front optical components from an object; and
   a pair of deflection members, each of said pair of deflection members disposed between said pair of front optical components and said optical member, arranged to deflect light fluxes coming from said pair of front optical components and to guide the deflected light fluxes to said optical member,
   wherein the size of each of said pair of deflection members corresponds to an angular extension of the light fluxes coming from said pair of front optical components when the lens unit is at a wide angle end.

2. An optical system according to claim 1, further comprising:
   a stop disposed at a position where the respective optical axes of said pair of front optical components intersect, or in the vicinity of that position.

3. An optical system according to claim 2, wherein said optical system satisfies the following condition:

$$25 \leq D1s$$

where D1S is an air-converted distance (mm) between each of said pair of front optical components and said stop.

4. An optical system according to claim 1, wherein each of said pair of shutter members are disposed on an object side of a respective one of said pair of front optical components.

5. An optical system according to claim 1, wherein each of said pair of shutter members are disposed between a respective one of said pair of front optical components and said optical member.

6. An optical system according to claim 1, wherein each of said pair of shutter members is a liquid crystal shutter.

7. An optical system according to claim 1, wherein said optical member is a triangular prism having two reflecting surfaces, the respective optical axes of said pair of front optical components and the optical axis of said rear optical component intersecting on a ridgeline which said two reflecting surfaces of said triangular prism form.

8. An optical system according to claim 1, wherein said optical system satisfies the following condition:

$$1.5 \leq Linp/fw \leq 5$$

where Linp is a distance from a surface on the most object side of each of said pair of front optical components to an entrance pupil, and fw is a focal length at a wide-angle end of said optical system.

9. An optical system according to claim 1, wherein said optical system satisfies the following condition:

$$45° < 2\omega$$

where $2\omega$ is a photographing angle of view at a wide-angle end.

10. An optical system according to claim 1, wherein said rear optical component includes two lens units of positive refractive power, said two lens units moving from an image side to an object side during variation of magnification from a wide-angle end to a telephoto end.

11. A stereoscopic image photographing apparatus, comprising:
   an optical system according to claim 1.

12. An optical system according to claim 1, wherein said optical system has a positive optical power as a whole.

* * * * *

UNITED STATES PATENT AND TRADEMARK OFFICE
CERTIFICATE OF CORRECTION

PATENT NO. : 6,922,285 B2  
APPLICATION NO. : 09/729345  
DATED : July 26, 2005  
INVENTOR(S) : Shuichi Kobayashi Page 1 of 1

It is certified that error appears in the above-identified patent and that said Letters Patent is hereby corrected as shown below:

Column 2,  
Line 58, "Theses" should read -- These --.

Column 11,  
Table 2, "r3=24.328   d3=0.70   n2=1.38300   $v2$=40.8" should read  
-- r3=24.328   d3=0.70   n2=1.88300   $v2$=40.8 --.

Column 16,  
Line 9, "25 ≤ D1s" should read -- 25 ≤ D1S --.

Signed and Sealed this

Twenty-seventh Day of June, 2006

JON W. DUDAS  
*Director of the United States Patent and Trademark Office*